(12) United States Patent
Fiebrich-Kandler et al.

(10) Patent No.: US 9,740,436 B2
(45) Date of Patent: Aug. 22, 2017

(54) ELASTIC FILE SYSTEM MANAGEMENT IN STORAGE CLOUD ENVIRONMENTS

(71) Applicant: International Business Machines Corporation, Armonk, NY (US)

(72) Inventors: Uwe Fiebrich-Kandler, Friesenheim (DE); Erik Rueger, Ockenheim (DE); Lance W. Russell, Rosanky, TX (US); Heiko Sick, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/541,500

(22) Filed: Nov. 14, 2014

(65) Prior Publication Data

US 2016/0139835 A1 May 19, 2016

(51) Int. Cl.
G06F 12/00 (2006.01)
G06F 13/00 (2006.01)
G06F 13/28 (2006.01)
G06F 3/06 (2006.01)

(52) U.S. Cl.
CPC ............ G06F 3/067 (2013.01); G06F 3/0607 (2013.01); G06F 3/0608 (2013.01); G06F 3/0631 (2013.01); G06F 3/0665 (2013.01)

(58) Field of Classification Search
CPC .. G06F 12/0223; G06F 3/0605; G06F 3/0631; G06F 3/0689
USPC ........................................................ 711/114
See application file for complete search history.

(56) References Cited

U.S. PATENT DOCUMENTS

| | | | | |
|---|---|---|---|---|
| 5,506,872 A | * | 4/1996 | Mohler | H03M 7/30 375/240 |
| 5,926,834 A | * | 7/1999 | Carlson | G06F 12/0862 711/118 |
| 7,600,073 B2 | * | 10/2009 | Kishi | G06F 3/0607 711/113 |

(Continued)

FOREIGN PATENT DOCUMENTS

| CN | 102685217 A | 9/2012 |
|---|---|---|
| CN | 103716414 A | 4/2014 |

OTHER PUBLICATIONS

Ghanbari, Hamoun et al., "Exploring Alternative Approaches to Implement an Elasticity Policy", 2011 IEEE 4th International Conference on Cloud Computing, Jul. 4-9, 2011, pp. 716-723.

(Continued)

*Primary Examiner* — Sheng-Jen Tsai
(74) *Attorney, Agent, or Firm* — Stephen R. Tkacs; Stephen J. Walder, Jr.; Randall J. Bluestone (57) ABSTRACT

A mechanism is provided in a data processing system for elastic data storage management in a storage network. A data storage system manager in the data processing system monitors remaining free space of a plurality of data storage systems. The data storage system manager determines a rate of change of remaining free space of each data storage system. Responsive to determining that the remaining free space or rate of change of remaining free space of at least one data storage exceeds a threshold, the data storage system manager determines an amount to expand or shrink a given data storage system in the storage network. The data storage system manager configures data storage allocation to expand or shrink the given data storage system by the determined amount.

19 Claims, 6 Drawing Sheets

(56) References Cited

U.S. PATENT DOCUMENTS

| | | | | |
|---|---|---|---|---|
| 7,904,689 B1* | 3/2011 | Carothers | G06F 17/30147 | 707/665 |
| 8,843,724 B2* | 9/2014 | Satoyama | G06F 3/0607 | 711/170 |
| 9,158,786 B1* | 10/2015 | Walsh | G06F 17/30194 | |
| 2002/0080721 A1* | 6/2002 | Tobagi | H04L 29/06 | 370/236 |
| 2002/0186961 A1* | 12/2002 | Kikuchi | G11B 19/04 | 386/248 |
| 2005/0010904 A1* | 1/2005 | Morioka | H04N 5/76 | 717/120 |
| 2006/0045039 A1* | 3/2006 | Tsuneya | H04L 41/0816 | 370/318 |
| 2006/0133775 A1* | 6/2006 | Ju | H04N 5/76 | 386/295 |
| 2007/0055704 A1* | 3/2007 | Watanabe | G06F 3/0608 | |
| 2008/0229025 A1* | 9/2008 | Plamondon | G06F 12/0862 | 711/126 |
| 2010/0082900 A1* | 4/2010 | Murayama | G06F 3/0608 | 711/114 |
| 2010/0138627 A1* | 6/2010 | Ossia | G06F 3/0619 | 711/171 |
| 2010/0217888 A1* | 8/2010 | Ukita | H04L 47/12 | 709/234 |
| 2011/0252214 A1* | 10/2011 | Naganuma | G06F 3/0607 | 711/170 |
| 2012/0078846 A1* | 3/2012 | Gold | G06F 11/1458 | 707/644 |
| 2012/0166744 A1* | 6/2012 | Yamashita | G06F 12/0261 | 711/159 |
| 2013/0007753 A1* | 1/2013 | Jain | G06F 9/46 | 718/103 |
| 2013/0067187 A1* | 3/2013 | Moss | G06F 3/0689 | 711/170 |
| 2013/0086585 A1* | 4/2013 | Huang | G06F 9/5072 | 718/1 |
| 2013/0100969 A1* | 4/2013 | Vafin | H04J 3/06 | 370/517 |
| 2013/0246702 A1* | 9/2013 | Shigeta | G06F 12/0223 | 711/112 |
| 2014/0068153 A1* | 3/2014 | Gu | G06F 3/0604 | 711/103 |
| 2014/0075412 A1* | 3/2014 | Kannan | H04L 41/5016 | 717/120 |
| 2014/0129719 A1* | 5/2014 | Weber | H04L 47/823 | 709/226 |
| 2014/0181370 A1* | 6/2014 | Cohen | G06F 12/0246 | 711/103 |
| 2014/0229701 A1* | 8/2014 | Jaquet | G06F 12/0238 | 711/171 |
| 2015/0095382 A1* | 4/2015 | Lin | G06F 17/30076 | 707/822 |
| 2015/0131440 A1* | 5/2015 | Kodama | H04L 47/225 | 370/231 |
| 2015/0242291 A1* | 8/2015 | Chang | G06F 11/2023 | 714/6.3 |
| 2015/0278693 A1* | 10/2015 | Sakai | G06N 5/04 | 706/58 |
| 2015/0319243 A1* | 11/2015 | Hussain | G06F 3/065 | 709/217 |
| 2015/0370488 A1* | 12/2015 | Watanabe | G06F 12/04 | 711/103 |
| 2016/0004455 A1* | 1/2016 | Iwasa | G06F 3/0608 | 711/112 |
| 2016/0162438 A1* | 6/2016 | Hussain | H04L 43/04 | 709/212 |

OTHER PUBLICATIONS

Vaquero, Luis M. at al., "'Dynamically Scaling Applications in the Cloud", ACM SIGCOMM Computer Communication Review, vol. 41, No. 1, Jan. 2011, pp. 45-52.

* cited by examiner

ELASTIC FILE SYSTEM MANAGEMENT IN STORAGE CLOUD ENVIRONMENTS

BACKGROUND

The present application relates generally to an improved data processing apparatus and method and more specifically to mechanisms for elastic file system management in storage cloud environments.

Network-attached storage (NAS) is file-level computer data storage server connected to a computer network providing data access to a heterogeneous group of clients. NAS not only operates as a file server, but is specialized for this task either by its hardware, software, or configuration of those elements. NAS is often manufactured as a computer appliance—a specialized computer built from the ground up for storing and serving files—rather than simply a general purpose computer being used for the role.

NAS devices began gaining popularity as a convenient method of sharing files among multiple computers. Potential benefits of dedicated network-attached storage, compared to general-purpose servers also serving files, include faster data access, easier administration, and simple configuration. NAS systems are networked appliances which contain one or more hard drives, often arranged into logical, redundant storage containers or redundant array of independent disks (RAID). Network-attached storage removes the responsibility of file serving from other servers on the network.

Cloud storage is a model of data storage where the digital data is stored in logical pools, the physical storage spans multiple servers (and often locations), and the physical environment is typically owned and managed by a hosting company. These cloud storage providers are responsible for keeping the data available and accessible, and the physical environment protected and running. People and organizations buy or lease storage capacity from the providers to store end user, organization, or application data.

Cloud storage services may be accessed through a co-located cloud compute service, a web service application programming interface (API) or by applications that utilize the API, such as cloud desktop storage, a cloud storage gateway or Web-based content management systems.

Cloud storage is based on highly virtualized infrastructure and is like broader cloud computing in terms of accessible interfaces, near-instant elasticity and scalability, multi-tenancy, and metered resources. Cloud storage services can be utilized from an off-premises service (Amazon S3) or deployed on-premises (ViON Capacity Services). Cloud storage typically refers to a hosted object storage service, but the term has broadened to include other types of data storage that are now available as a service, like block storage.

Object storage services like Amazon S3™ and Microsoft Azure Storage™, object storage software like Openstack Swift™, object storage systems like EMC Atmos™ and Hitachi Content Platform™, and distributed storage research projects like OceanStore™ and VISION Cloud™ are all examples of storage that can be hosted and deployed with cloud storage characteristics.

Cloud storage is made up of many distributed resources, but still acts as one—often referred to as federated storage clouds. Cloud storage is highly fault tolerant through redundancy and distribution of data. Cloud storage is highly durable through the creation of versioned copies and is typically eventually consistent with regard to data replicas.

SUMMARY

In one illustrative embodiment, a method is provided in a data processing system for elastic data storage management in a storage network. The method comprises monitoring, by a data storage system manager in the data processing system, remaining free space of a plurality of data storage systems in the storage network. The method further comprises determining, by the data storage system manager, a rate of change of remaining free space of each of the plurality of data storage systems. The method further comprises responsive to the data storage system manager determining that the remaining free space or rate of change of remaining free space of at least one data storage system exceeds a threshold, determining an amount to expand or shrink a given data storage system in the storage network. The method further comprises configuring, by the elastic data storage system manager, data storage allocation to expand or shrink the given data storage system by the determined amount.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

When data, files, and applications are installed or executed, the success of the installation depends on sufficient free disk space remaining on the related file system. An installation or application may fail or become unresponsive if the file system becomes full. It may be possible that log files that may describe the problem or its cause cannot be written to the disk because of a lack of free space on the disk.

One solution to the problem of failing applications or failing installations due to insufficient remaining free disk space is based on monitoring and alerting, which requires manual intervention. Such a solution monitors remaining free space from time to time. If a predefined threshold is reached, the solution triggers actions, such as sending Simple Network Management Protocol (SNMP) traps, emails, Short Message Service (SMS) messages, popup windows, etc., to inform a user or administrator of a potential problem with remaining free disk space. Soft quotas and thin provisioning provide similar solutions for extension and shrinking of the file system size, but these solutions also require manual intervention without dynamic elasticity.

Other solutions to the problem of failing applications or failing installations due to insufficient remaining free disk space are built into the applications themselves. These solutions monitor, while running, the remaining free disk space and stop if a predefined threshold is reached before the application itself fails. These solutions notify the user, who must decide how to proceed before the application is told to continue or finish.

All current solutions require human interaction and do not work if human interaction does not take place in a timely fashion. In cloud storage environments, the number of file systems and file sets to be managed is such that any solution relying on manual interaction is untenable. The illustrative embodiments provide mechanisms for elastic file system management in storage cloud environments. The illustrative embodiments provide a supervisor that observes all file systems in a storage cloud environment and controls their elasticity by expansion and shrinking. The supervisor considers built-in rules and thresholds, as well as rules and thresholds applied by a user. In one embodiment, the rules consider file system priority groups, which can be predefined or manually updated by the user.

In one example embodiment, priority groups may be different storage tiers, such as solid-state drives, hard disk drives, and tape drives, for example, having different physical characteristics. In another example embodiment, priority groups may exist on a single storage tier. For example, a server may need different priority partitions on the same storage tier.

The disclosed embodiments refer to file systems; however, aspects of the illustrative embodiments apply to other forms of data storage, such as filesets, block storage, and object storage. A file system is used to control how data is stored and retrieved. The structure and logic rules used to manage groups of information and their name is called a "file system."

In the AIX® operating system a "fileset" is the smallest individually installable unit (a collection of files that provides a specific function). The Distributed Computing Environment/Distributed File System (DCE/DFS) uses the term fileset to define a tree containing directories, files, and mount points (links to other DFS filesets). A DFS fileset is also a unit of administrative control. Properties such as data location, storage quota, and replication are controlled at this level of granularity. Filesets are light weight components compared to file systems, so management of a file set is easier.

A block, sometimes called a physical record, is a sequence of bytes or bits, usually containing some whole number of records, having a maximum length, a block size. Data thus structured are said to be blocked. The process of putting data into blocks is called blocking, while de-blocking is the process of extracting data from blocks. Blocked data is normally stored in a data buffer and read or written a whole block at a time. Blocking reduces the overhead and speeds up the handling of the data-stream.

Object storage is a storage architecture that manages data as objects, as opposed to other storage architectures like file systems, which manage data as a file hierarchy, and block storage, which manages data as blocks within sectors and tracks. Each object typically includes the data itself, a variable amount of metadata, and a globally unique identifier. Object storage can be implemented at multiple levels, including the device level (object storage device), the system level, and the interface level. In each case, object storage seeks to enable capabilities not addressed by other storage architectures, like interfaces that can be directly programmable by the application, a namespace that can span multiple instances of physical hardware, and data management functions like data replication and data distribution at object-level granularity.

The mechanisms of the illustrative embodiments also control dependencies of different file systems and file sets to the related underlying hardware. In a fully automated self-configuring mode, the supervisor adds self-configuration capabilities to systems that rely on data stored in multiple file systems. Alternatively, the supervisor runs in an advisory mode, providing only suggestions but not applying any changes to the file system.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
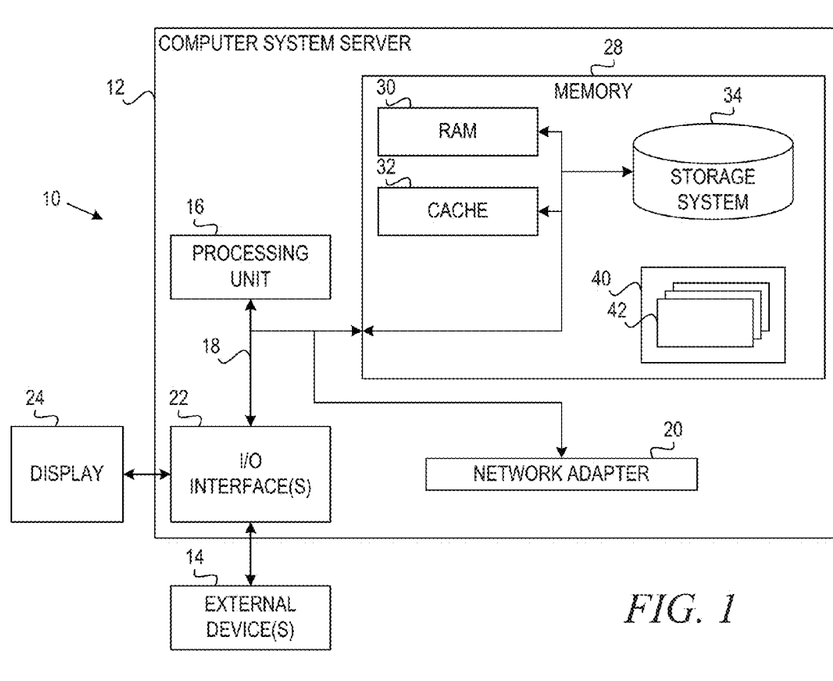
FIG. 1 depicts a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
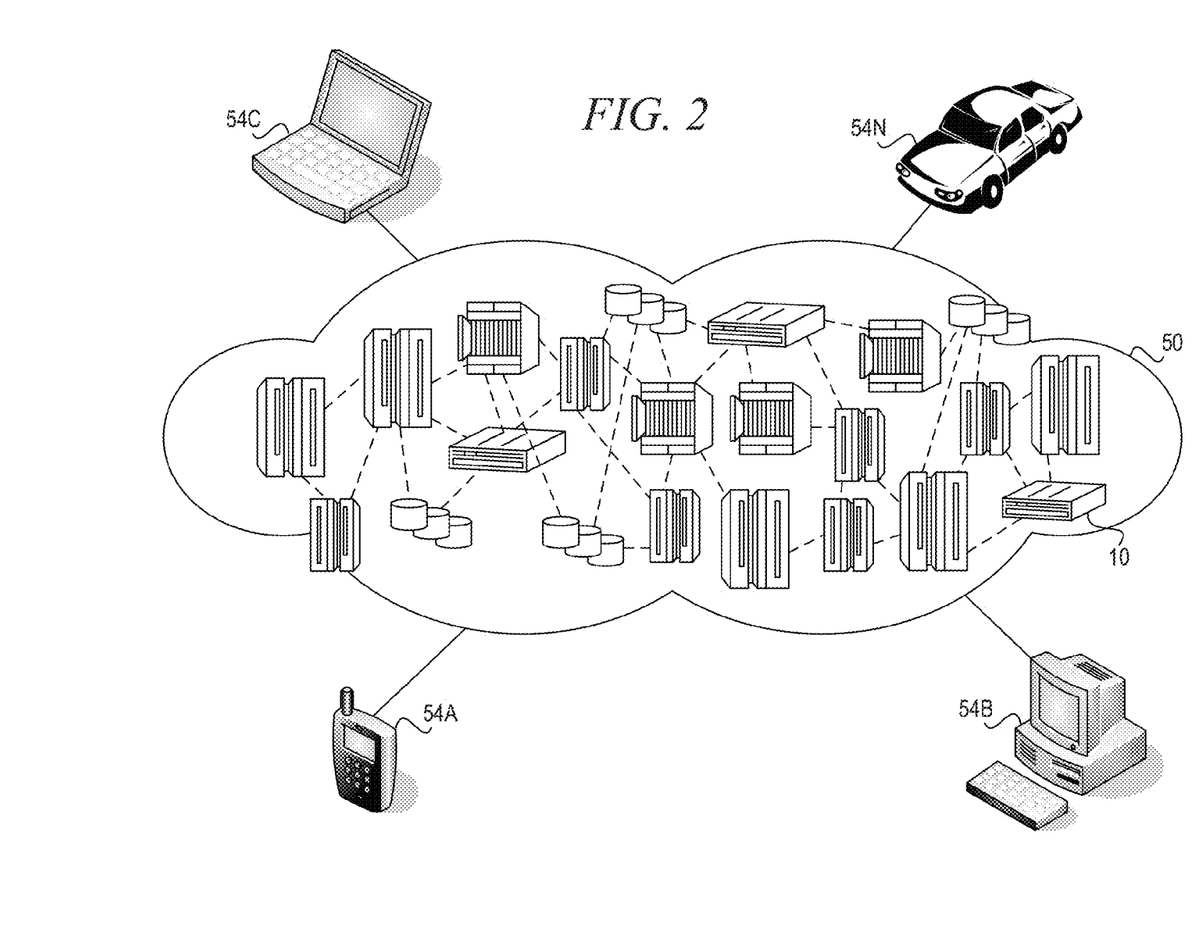
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
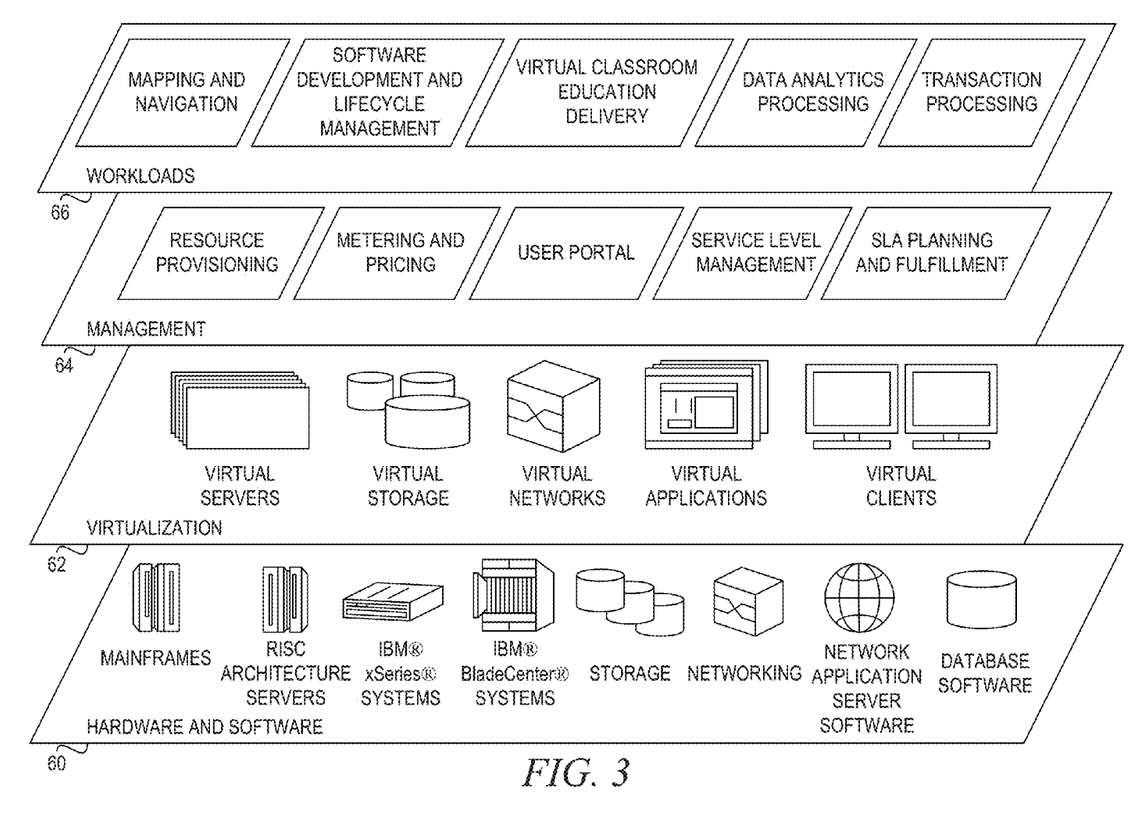
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries' systems; RISC (Reduced Instruction Set Computer) architecture based servers, in one example IBM pSeries® systems; IBM xSeries@® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage: virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

In one illustrative embodiment, resource provisioning in management layer 64 comprises a mechanism for elastic file system size allocation. The mechanism makes use of the ability of current file systems to be expanded or shrunk on demand while the file system is in use. The mechanism introduces a file system allocation supervisor that runs on top of the file systems or file sets. The file system allocation supervisor performs elastic file system management in a storage cloud environment, such as General Parallel File System (GPFS).

GPFS is a high-performance clustered file system developed by IBM. It can be deployed in shared-disk or shared-nothing distributed parallel modes. GPFS is used by many of the world's largest commercial companies, as well as some supercomputers. GPFS provides concurrent high-speed file access to applications executing on multiple nodes of clusters. In addition to providing filesystem storage capabilities, GPFS provides tools for management and administration of the GPFS cluster and allows for shared access to file systems from remote GPFS clusters.

Figure 4A:
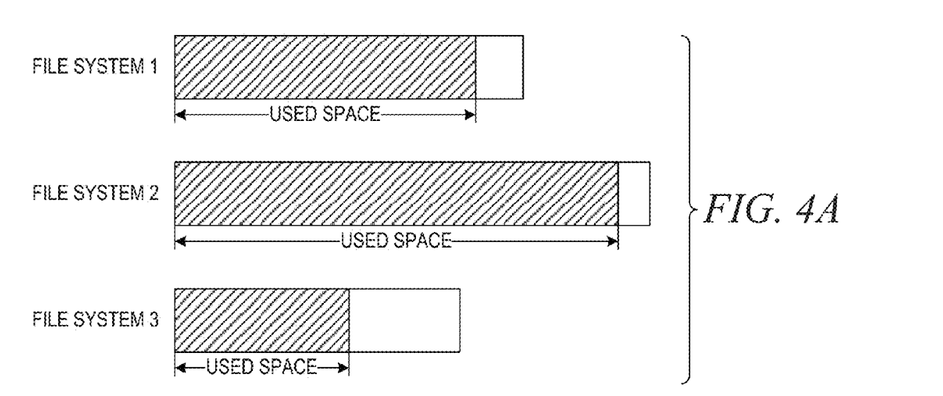
FIGS. 4A and 4B illustrate monitoring remaining free space from file systems existing on the system in accordance with an illustrative embodiment.
Figure 4B:
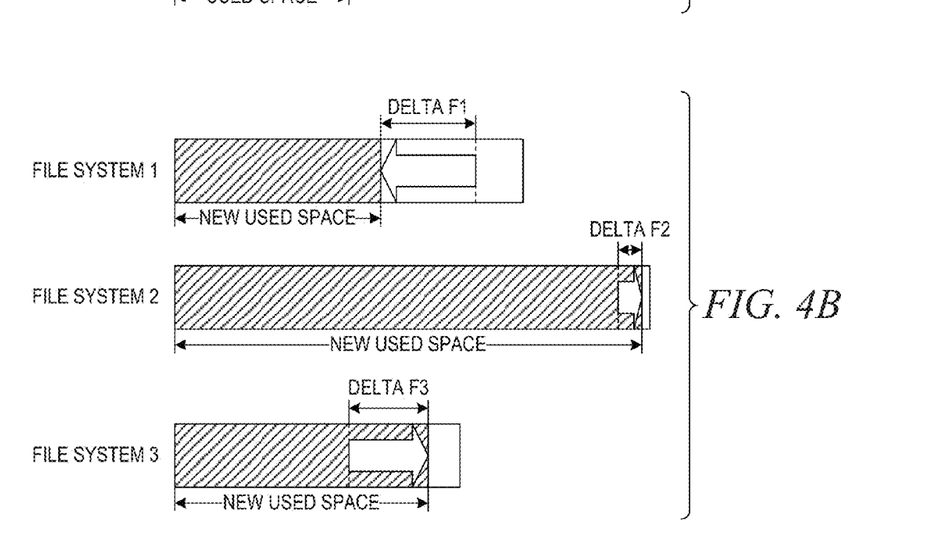

FIGS. 4A and 4B illustrate monitoring remaining free space from file systems existing on the system in accordance with an illustrative embodiment. Referring to FIG. 4A, a file system allocation supervisor monitors remaining free space from file systems (or file sets) (F1 . . . FN) existing within a storage cloud environment. In the depicted example, the file systems comprise file system 1 with free space F1, file system 2 with free space F2, and file system 3 with free space F3.

Turning to FIG. 4B, the file system allocation supervisor detects the used space for the file systems have changed. In the depicted example, file system 1 decreased the used space and increased free space (delta F1), file system 2 increased used space and decreased free space (delta F2), and file system 3 increased used space and decreased free space (delta F3). The file system allocation supervisor keeps track of the rate of change (trends) in the increase or decrease of remaining free space in each file system.

One or more of the file systems may have a capability to be queried for the rate of change information. The file system allocation supervisor calculates the rate of change in the increase or decrease of remaining free space for each file system that does not have this capability.

Figure 5:
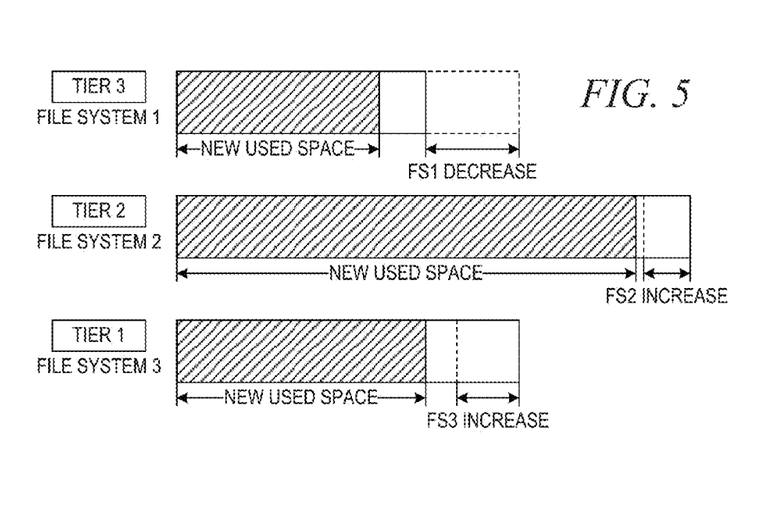
FIG. 5 illustrates monitoring remaining free space from file systems in storage tiers on the system in accordance with an illustrative embodiment.

FIG. 5 illustrates monitoring remaining free space from file systems in storage tiers on the system in accordance with an illustrative embodiment. The file system allocation supervisor accepts tiering information if the user has assigned tiering to the file systems. Automated tiered storage is the automated progression or demotion of data across different tiers of storage devices and media. This movement of data is automatic to the types of disk according to performance and capacity requirements. In the depicted example, a file system containing files needed for the operating system can be in the highest tier, tier 1, while normal application files are in tier 2 and file systems containing less important information, such as downloads, temporary files, old dump files, deleted files, etc., are in tier 3. In the depicted example, file system 3 is in tier 1, file system 2 is in tier 2, and file system 1 is in tier 3. In one example embodiment, file system 3 (tier 1) may comprise fast storage devices, such as Solid State Disks (SSDs) to store files that are likely to be accessed most frequently. File system 2 (tier 2) may comprise less expensive storage devices that have a longer access time, such as Hard Disk Drives (HDDs), which have latency due to spinning disks and mechanically moving read heads. File system 1 (tier 3) may comprise slower storage devices, such as slower HDDs or tape drives. In the depicted embodiment, the storage tiers are examples of priority groups.

The file system allocation supervisor is aware of pre-defined thresholds of allowable remaining free disk space and for allowable rate of change per file system and for the whole storage cloud. These thresholds are adjustable by the user. In one illustrative embodiment, the supervisor executes a process that monitors the values of remaining free space (FI) and rate of change of remaining free space (VI=Delta FI/Delta T, where T=time since last monitor run) for the different file systems (I=1 . . . N) as well as for the whole system (F=SUM(FI) resp V=Delta F/Delta T).

If the file system allocation supervisor determines a threshold is reached, then the process determines whether to expand or shrink one or more of the file systems on the fly based on the history of F, V, FI, and VI. The determination may be based on tiering information, if available. For example, shrinking the tier 3 file system may have priority over shrinking the tier 2 file system.

In the depicted example, the file system allocation supervisor decreases file system 1 (FS1) and increases file system 2 (FS2) and file system 3 (FS3). In one example embodiment, the FS2 increase plus the FS3 increase is equal to the FS1 decrease. Alternatively, the file system allocation supervisor may expand or shrink the whole storage system (storage cloud) to accommodate the individual file system increases or decreases.

Figure 6:
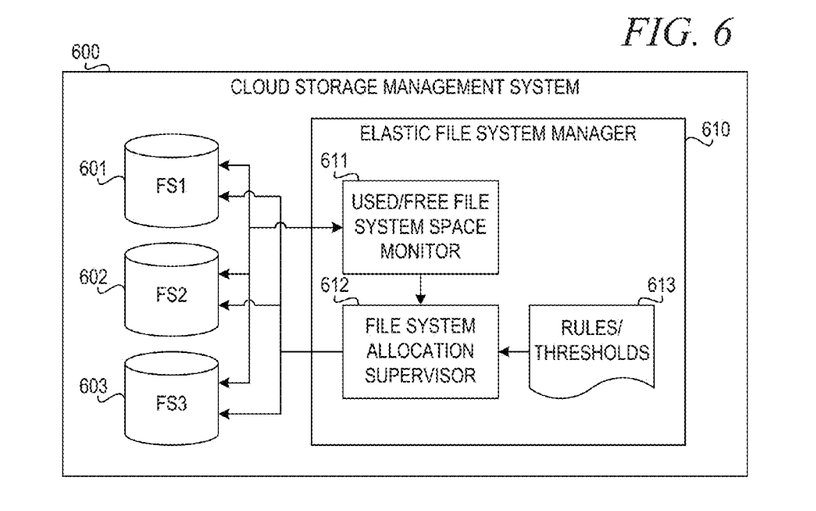
FIG. 6 is a block diagram of a cloud storage management system in accordance with an illustrative embodiment.

FIG. 6 is a block diagram of a cloud storage management system in accordance with an illustrative embodiment. The cloud storage management system 600 has an elastic file system manager 610 that manages file system 1 (FS1) 601, file system 2 (FS2) 602, and file system 3 (FS3) 603. Elastic file system manager 610 has used/free file system space monitor 611 and file system allocation supervisor 612. Used/free file system space monitor 611 monitors the used space, free space, and rate of change of increase or decrease for file systems 601-603. As stated above, used/free file system space monitor may receive the used space, free space, and rate of change of increase or decrease from the file systems themselves. Alternatively, used/free file system space monitor may receive the used space and/or free space from the file systems and calculate the rate of change of increase or decrease.

File system allocation supervisor 612 receives rules/thresholds 613, which may include thresholds for used space, free space, and/or rate of change. File system allocation supervisor 612 receives used space, free space, and rate of change data from used/free file system space monitor 611. File system allocation supervisor 612 determines free space (FI) and rate of change (VI) for each file system, as well as the free space (F) and rate of change (V) for the whole storage cloud. File system allocation supervisor 612 determines whether to expand or shrink one or more file systems 601-603 or the whole storage cloud.

File system allocation supervisor 612 determines whether to expand or shrink the file systems on the fly based on the history for F, V, FI, and VI. File system allocation supervisor 612 also bases the determination of whether to expand or shrink one or more file systems based on priority group information. For example, file system allocation supervisor 612 may give shrinking a tier 3 file system a higher priority than shrinking a tier 2 file system.

In one illustrative embodiment, file system allocation supervisor 612 receives the following:

data specifying which file systems, file sets, block storages, or object storages exist at any given time in the system;

data specifying which file systems, file sets, block storages, or object storages depend on each other, e.g., file systems that share the same base media with limited overall capacity:

data specifying which of the underlying media is of static capacity (can be reduced but not expanded) and which media add capacity on demand:

data specifying whether any user-defined or priority group specific thresholds exist for those entities (allowable remaining free space, allowable speed of change); and data specifying whether the legacy providers of the file systems, file sets, or object storages serve the speed of change (trend) or has a supervisor to keep track of the values.

In one example embodiment, file system allocation supervisor 612 determines and keeps track of, for any monitored entity:

remaining free space;

rate of change of remaining free space; and history of expand/shrink actions (timestamp, value, priority group).

File system allocation supervisor 612 determines and keeps track of, for any base media shared by one or more monitored entities:

total and free space of base media;

rate of change of total and free space of base media; and history of experienced changes (total media space, participating entities).

File system allocation supervisor 612 provides the following outputs:

commands or suggestions to expand/shrink one or more of the monitored entities by certain values;

top reports, history trends, or future trends of space/capacity changes per monitored entity, per base media, and overall;

suggestions for expansion of base media;

suggestions for moving an entity from one base medium to another compatible base medium;

suggestions for promotion/degradation of certain entities from one priority group to another; and suggestions for modification of thresholds.

In one illustrative embodiment, file system allocation supervisor 612 supports two modes of operation: a fully automated self-configuration mode and an advisor mode. In the fully automated mode, file system allocation supervisor 612 automatically configures file systems 601-603 to expand or shrink based on the history of F, V, FI, and VI. In the advisor mode, file system allocation supervisor 612 provides notifications or suggestions to a user or administrator. In one example embodiment, file system allocation supervisor 612 configures one or more file systems to expand or shrink pending authorization by a user or administrator. In this embodiment, the user receives notification of the threshold being exceeded and the configuration of the one or more file systems. The user or administrator need only authorize execution of the file system configuration. In another example embodiment, file system allocation supervisor 612 provides a notification to a user or administrator with a suggested configuration of the one or more file systems. The user or administrator must then perform the configuration manually.

In one example embodiment, file allocation supervisor 612 obtains the tier information and the thresholds from rules/thresholds 613. File allocation supervisor 612 determines how much to expand or shrink file systems, and which ones, based on the rules and tiering information. Rules/thresholds 613 may be built-in or may be user defined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
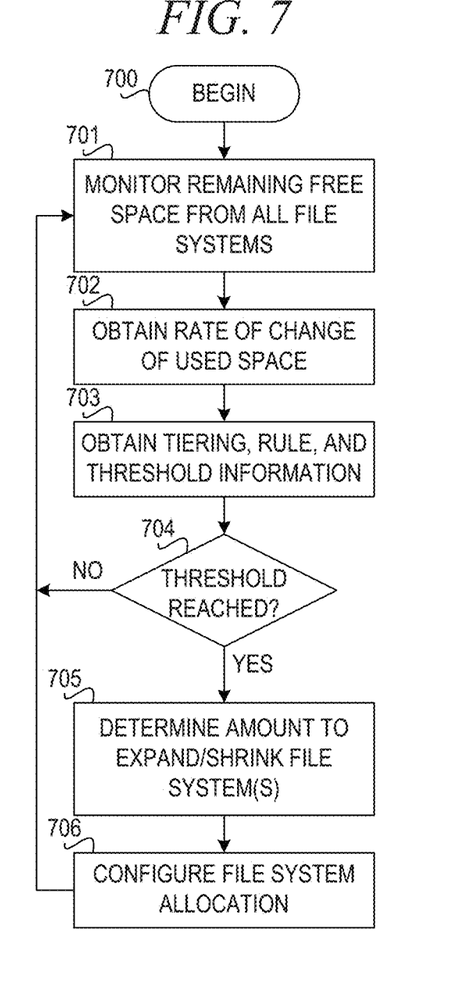
FIG. 7 is a flowchart illustrating operation of a mechanism for elastic file system management in a storage cloud environment in accordance with an illustrative embodiment.

FIG. 7 is a flowchart illustrating operation of a mechanism for elastic file system management in a storage cloud environment in accordance with an illustrative embodiment. Operation begins (block 700), and the mechanism monitors remaining free space from all file systems in the storage cloud environment (block 701). The mechanism obtains a rate of change of used space (block 702). The mechanism may obtain the rate of change of used space directly from the file systems or may calculate the rate of change based on the monitored free space.

The mechanism obtains priority group information, rules, and thresholds from a built-in and/or user defined profile (block 703). The mechanism determines whether a threshold has been reached (block 704). The mechanism may determine whether a free space threshold or a rate of change threshold is reached for one or more file systems or for the storage cloud as a whole. If the mechanism determines that a threshold is not reached in block 704, then operation returns to block 701 to monitor remaining free space from all file systems.

If the mechanism determines that at least one threshold is reached in block 704, the mechanism determines an amount to expand or shrink one or more file systems (block 705). Then, the mechanism configures file system allocation to expand or shrink the one or more file systems (block 706). The mechanism may configure file system allocation automatically or may notify a user or administrator of the threshold being reached with a suggested file system allocation configuration. A user or administrator may then perform the suggested file system allocation configuration. Thereafter, operation returns to block 701 to monitor remaining free space from all file systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for elastic file system management in storage cloud environments. The mechanisms of the illustrative embodiments provide fast file system demand fulfillment with lower cost compared to manual solutions. The mechanisms of the illustrative embodiments also provide cloud storage space efficiency. The mechanisms of the illustrative embodiments apply to file systems, file sets, and network attached storage (NAS) products in software defined storage in cloud environments. The mechanisms may also be embodied in Object Store, addressing the problem that applications constrained to using specific storage can run out of space even if there is free space elsewhere in the data center. The illustrative embodiments not only offer an automatic solution for dynamic elasticity, but also provides for new capabilities to perform analysis on the data and metadata available in the process.

The file system allocation supervisor observes the file systems, file sets, or object stores and controls file system allocation by expanding or shrinking them based on rules, thresholds, etc. The file system allocation supervisor may be realized as a new, additional, integral, embedded component that is added to existing storage management systems. For example, the file system allocation supervisor may be added as a GPFS management stack. The file system allocation supervisor extends existing components, such as file system manager, metadata manger, configuration manager, etc.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a cloud storage management system, for elastic data storage management in a storage cloud, the method comprising:
    monitoring, by an elastic file system manager in a resource provisioning component of a management layer of the cloud storage management system, remaining free space of a plurality of file systems in the storage cloud managed by the cloud storage management system;
    determining, by the elastic file system manager, a rate of change of remaining free space of each of the plurality of file systems;
    obtaining, by the elastic file system manager, priority group information, rules, and priority group specific thresholds from a profile data structure;
    responsive to the elastic file system manager determining that the rate of change of remaining free space of a given file system exceeds a threshold within the priority group specific thresholds, determining an amount to modify a size of the given file system based on a priority group of the given file system, based on the rules and priority group specific thresholds, and based on data specifying file system dependencies;
    configuring, by the elastic file system manager, a first data storage allocation to modify the size of the given file system by the determined amount; and
    configuring, by the elastic file system manager, a second data storage allocation to modify a size of the storage cloud to accommodate the first data storage allocation.

2. The method of claim 1, wherein monitoring the remaining free space of each file system comprises receiving the remaining free space from each file system.

3. The method of claim 1, wherein determining the rate of change of remaining free space of each file system comprises receiving the rate of change of remaining free space from each file system.

4. The method of claim 1, wherein determining the rate of change (VI) of remaining free space of a given file system (I) comprises determining:

$$VI = \text{Delta}FI / \text{Delta}T,$$

where FI=free space of the given file system and T=time since a last monitor run.

5. A computer program product comprising a computer readable storage medium having a computer readable program stored therein, wherein the computer readable program, when executed on at least one processor of a cloud storage management system, causes the at least one processor to implement an elastic file system manager in a resource provisioning component of a management layer of the cloud storage management system, wherein the computer readable program causes the at least one processor to:
    monitor, by the elastic file system manager, remaining free space of a plurality of file systems in a storage cloud managed by the cloud storage management system;
    determine, by the elastic file system manager, a rate of change of remaining free space of each of the plurality of file systems;
    obtain, by the elastic file system manager, priority group information, rules, and priority group specific thresholds from a profile data structure;
    responsive to the elastic file system manager determining that the rate of change of remaining free space of a given file system exceeds a threshold within the priority group specific thresholds, determine an amount to modify a size of the given file system based on a priority group of the given file system, based on the rules and priority group specific thresholds, and based on data specifying file system dependencies;
    configure, by the elastic file system manager, a first data storage allocation to modify the size of the given file system by the determined amount; and
    configure, by the elastic file system manager, a second data storage allocation to modify a size of the storage cloud to accommodate the first data storage allocation.

6. The computer program product of claim 5, wherein determining the rate of change of remaining free space of each file system comprises receiving the rate of change of remaining free space from each file system.

7. The computer program product of claim 5, wherein determining the rate of change (VI) of remaining free space of a given file system (I) comprises determining:

$$VI = \Delta FI / \Delta T,$$

where FI=free space of the given file system and T=time since a last monitor run.

8. An apparatus comprising:
at least one processor; and
a memory coupled to the processor, wherein the memory comprises instructions which, when executed by the processor, cause the at least one processor to implement an elastic file system manager in a resource provisioning component of a management layer of a cloud storage management system, wherein the instructions cause the at least one processor to:
monitor, by the elastic file system manager, remaining free space of a plurality of file systems in a storage cloud managed by the cloud storage management system;
determine, by the elastic file system manager, a rate of change of remaining free space of each of the plurality of file systems;
obtain, by the elastic file system manager, priority group information, rules, and priority group specific thresholds from a profile data structure;
responsive to the elastic file system manager determining that the rate of change of remaining free space of a given file system exceeds a threshold within the priority group specific thresholds, determine an amount to modify a size of the given file system based on a priority group of the given file system, based on the rules and priority group specific thresholds, and based on data specifying file system dependencies;
configure, by the elastic file system manager, a first data storage allocation to modify the size of the given file system by the determined amount; and
configure, by the elastic file system manager, a second data storage allocation to modify a size of the storage cloud to accommodate the first data storage allocation.

9. The method of claim 1, further comprising:
tracking, by the elastic file system manager, a history of modification operations; and
generating, by the elastic file system manager, an output report including history trends or future trends of space/capacity changes per data storage system, per base medium, and overall.

10. The method of claim 9, wherein the output report further includes at least one of a suggestion for expansion of a base medium of the given data storage system, a suggestion for moving the given data storage system from one base medium to another compatible base medium, or a suggestion for promotion/degradation of the given data storage system from one priority group to another.

11. The method of claim 9, wherein the output report further include a suggestion for modification of one or more of the priority group specific thresholds.

12. The computer program product of claim 5, wherein the computer readable program further causes the at least one processor to:
track, by the elastic file system manager, a history of modification operations; and
generate, by the elastic file system manager, an output report including history trends or future trends of space/capacity changes per data storage system, per base medium, and overall.

13. The computer program product of claim 12, wherein the output report further includes at least one of a suggestion for expansion of a base medium of the given data storage system, a suggestion for moving the given data storage system from one base medium to another compatible base medium, or a suggestion for promotion/degradation of the given data storage system from one priority group to another.

14. The computer program product of claim 12, wherein the output report further include a suggestion for modification of one or more of the priority group specific thresholds.

15. The apparatus of claim 8, wherein the instructions further cause the at least one processor to:
tracking, by the elastic file system manager, a history of modification operations; and
generating, by the elastic file system manager, an output report including history trends or future trends of space/capacity changes per data storage system, per base medium, and overall.

16. The apparatus of claim 15, wherein the output report further includes at least one of a suggestion for expansion of a base medium of the given data storage system, a suggestion for moving the given data storage system from one base medium to another compatible base medium, or a suggestion for promotion/degradation of the given data storage system from one priority group to another.

17. The apparatus of claim 15, wherein the output report further include a suggestion for modification of one or more of the priority group specific thresholds.

18. The apparatus of claim 8, wherein determining the rate of change of remaining free space of each file system comprises receiving the rate of change of remaining free space from each file system.

19. The apparatus of claim 8, wherein determining the rate of change (VI) of remaining free space of a given file system (I) comprises determining:

$$VI = \Delta FI / \Delta T,$$

where FI=free space of the given file system and T=time since a last monitor run.

* * * * *